Nov. 10, 1959 E. F. MAYER 2,912,592

MEMORY DEVICE

Filed Oct. 7, 1954

INVENTOR

EDWARD F. MAYER

BY Lawrence J Field

ATTORNEY

United States Patent Office 2,912,592

Patented Nov. 10, 1959

2,912,592

MEMORY DEVICE

Edward F. Mayer, Cleveland, Ohio, assignor to Horizons Incorporated, Princeton, N.J., a corporation of New Jersey Application October 7, 1954, Serial No. 460,796

3 Claims. (Cl. 250—211)

This invention relates to an improved memory type device which may be employed for the storage of information and to a system wherein such a device is employed. Such memory type devices are commonly used in conjunction and with computing and tabulating machines.

Prior art memory type devices associated with computing machines have included electrostatic tubes, ferroelectric storage devices, magnetic torriod and magnetic drum mercury delay line devices. Each of the prior art devices has been found to possess certain inherent disadvantages as set forth in a review published October 1953, of the Institute of Radio Engineers (volume 41, No. 10). Even the simpler devices are relatively expensive and the more complex devices require elaborate circuits in conjunction therewith.

In contrast with the above I have developed a memory type device which is low in cost per unit of storage and simple in construction and which does not require either complex switching or complex auxiliary circuits.

It is one object of my invention to provide a simple and inexpensive memory type device in which information may be stored indefinitely.

It is another object of my invention to provide a memory device in which a photoconductive material is employed for the storage of information.

It is another object of my invention to provide an improved memory device in which access to the stored information is completely random, that is, a device in which any single piece of information may be read without disturbing or reading any other piece of information.

It is a further object of my invention to provide an improved memory device in which the signal strength is several times the noise level.

Another object of my invention is to provide a system for writing information into and reading information from such a memory device.

A further object of my invention is to provide a memory device which may furnish both qualitative (yes or no) and quantitative (amount) information.

These and other objects are accomplished by means of the apparatus shown in the attached drawings in which.

In accordance with my invention, instead of the prior art memory type devices, I employ a storage device which may take any one of several forms as seen in Figure 1. Essentially the memory is a sandwich comprising: a transparent electrode, an insulating layer, a high resistance photoconductive material and a metal electrode.

The transparent electrode may be formed of any transparent conductive material applied to clear glass or plastic. Materials such as gold, silver, or tin salts in thickness of from 200A. to 1500A. have been successfully employed.

The insulating layer is preferably composed of a plastic such as a polystyrene, polyester, or acrylic.

The photoconductive material is chosen from materials having an extremely high dark resistance, greater than $10^{12}$ ohm cm. and an appreciable light sensitivity. Materials such as ZnS, ZnS-CdS, $ZnSiO_3$ and $Sb_2S_3$ have been found to be satisfactory and many other materials with the desired properties will readily suggest themselves to those skilled in the art.

The metal electrode ordinarily takes the form of a thin film of any suitable metal and may be sprayed or evaporated upon the previously prepared sandwich.

Before proceeding to the manner in which it is used, the storage device itself will be described.

Figure 1A:
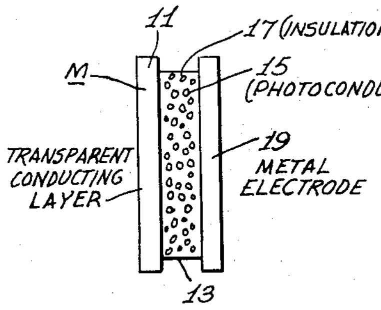
Figure1 shows cross sectional views of several embodiments of a memory sandwich prepared in accordance with my invention.

The simplest embodiment is shown in Figure 1*a* in which M, the memory device, is shown in section as a sandwich consisting of a transparent conducting layer 11, a core 13 comprising photoconductor material 15 and insulator material 17 preferably with the former dispersed in the form of discrete particles embedded in the latter and a third layer 19 consisting of a metal electrode. In such a sandwich the photoconductive material is suspended in an insulating plastic such as polystyrene, and painted, flowed or molded onto the layer of transparent conductive material which serves as the first electrode. The photoconductive layer in a typical application is 0.005″ thick. Layer 19 may be extremely thin in which instance it may be a layer of metal evaporated or sprayed onto layer 13, or it may be foil or plate.

Figure 1B:
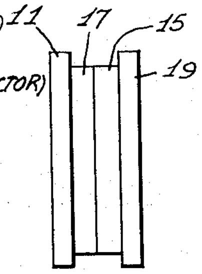

In a second embodiment shown in Figure 1*b*, the sandwich is made of a metal electrode 19, on which a continuous film of the photoconductor 15 is disposed. Next a layer 17 of transparent high-resistance material such as mica, or a polystyrene is placed adjacent layer 15 and over this is placed the second electrode 11.

Figure 1C:
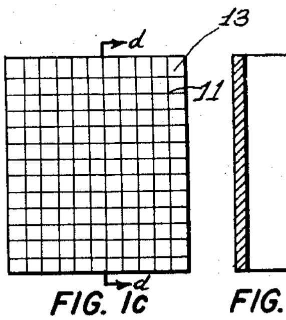
Figure 1D:
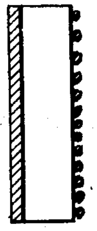

Instead of continuous electrodes over the entire face of the photoconductor layer, the electrodes may as shown in Figures 1*c* and 1*d* consist of grids on each side of the photoconductor layer.

Whichever form of sandwich chosen, the devices all function in substantially the following manner: A beam of light is caused to illuminate selected portions of the sandwich while a potential is impressed across the two electrodes of the sandwich. This causes the photoconductive material to become polarized (about 100$\mu$ sec. are required) in which state it remains after the polarizing potential and the light source are removed. To read out the information stored the memory sandwich is scanned by means of a light beam whereby depolarization is effected.

Figure 2:
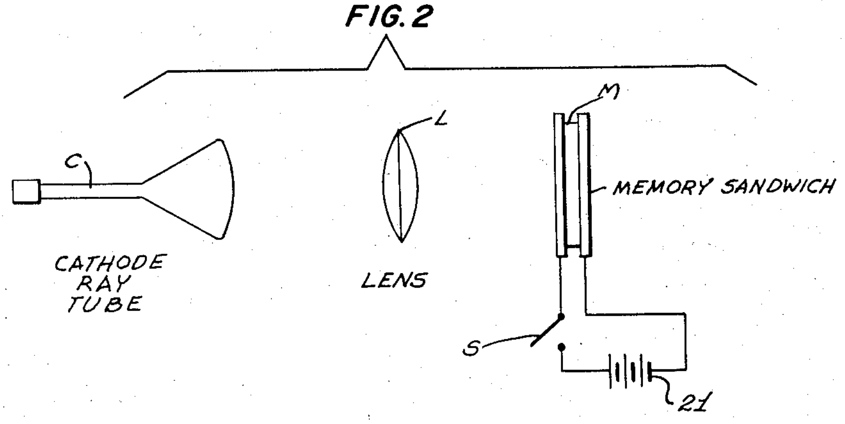
Figure 2 is a schematic view showing a system for writing information into the memory sandwich.

To further illustrate the manner in which the sandwich may be utilized, there is shown in Figure 2 one form of system for writing information into the sandwich. A conventional cathode ray tube C equipped with means to position the beam horizontally as well as vertically serves as the light source for writing information into the memory sandwich M. A lens L positioned between the normal cathode ray tube C and the memory sandwich M images the phosphor surface onto the photoconductive layer 13. When writing into the device a polarizing potential is applied between the transparent conducting electrode 11 and the metal electrode 19 by means of a battery 21. Each area of the memory device is either illuminated (one or yes) or remains dark (zero or no) according to the information fed in by the cathode ray tube. After the entire sandwich, or only a portion of the sandwich is filled, the polarizing potential is removed and the device may be read by reilluminating the area in which information is stored by means of any suitable beam of light. If the area was previously illuminated, a pulse will be obtained on reillumination, signifying "one" or "yes" whereas if the area was dark, no pulse will be obtained.

Figure 3:
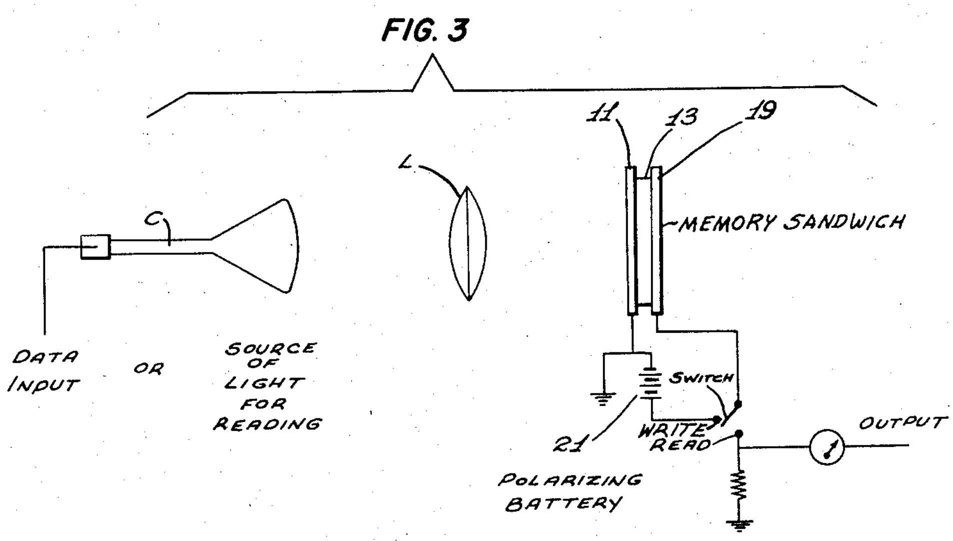
Figure 3 is another schematic view of a modification in which a single source of illumination is employed for both writing in and reading out information.

It will be appreciated that by suitable switching, the same light source may be employed to write and to read. Figure 3 is schematic view showing such a sytsem.

From the foregoing it will be seen that I have provided a system possessing all the idealized requirements of a storage system. The cost is low per unit storage because of the simplicity of the memory sandwich and because the remaining elements are conventional pieces of apparatus. The memory remains for considerable periods of time and results have been obtained in which the information was read several weeks after it was written. As will be recognized access to stored information is random, that is, access may be had to any piece of information stored without affecting any other piece of information, and without the necessity of reading through other stored information to obtain the desired bit, a distinct advantage over many other systems in use today.

I claim:

1. A system for storing information comprising in combination: a light source adapted to feed into the system the information to be stored therein; a memory element comprising: a transparent electrically-conductive electrode and a metallic electrode spaced from and substantially parallel to one another, and having a photoconductive material and an electrically insulating material filling the space between said transparent electrode and said metal electrode; means to impress a polarizing potential across said electrodes, while said transparent electrode is being illuminated with light from said light source and for a time sufficient for polarization to occur; and means to recover and detect the information stored in said sandwich by application of light alone to said sandwich, said detecting means comprising a circuit adapted to detect the current resulting from the release of the polarization charges developed during the feeding in of information to said sandwich.

2. The system of claim 1 wherein the photoconductive material in the memory sandwich is dispersed throughout the electrically insulating material.

3. The system of claim 1 wherein the photoconductive material and electrically insulating material are in the form of continuous films positioned between the two electrodes.

References Cited in the file of this patent

UNITED STATES PATENTS

| | | |
|---|---|---|
| 2,212,923 | Miller | Aug. 27, 1940 |
| 2,248,985 | Gray | July 15, 1941 |
| 2,587,830 | Freeman | Mar. 4, 1952 |
| 2,624,857 | Mager | Jan. 6, 1953 |
| 2,743,430 | Schultz et al. | Apr. 24, 1956 |
| 2,747,104 | Jacobs | May 22, 1956 |
| 2,764,693 | Jacobs et al. | Sept. 25, 1956 |
| 2,780,731 | Miller | Feb. 5, 1957 |
| 2,784,389 | Kelly | Mar. 5, 1957 |
| 2,873,380 | Kazan | Feb. 10, 1959 |

FOREIGN PATENTS

| | | |
|---|---|---|
| 713,916 | Great Britain | Aug. 18, 1954 |

OTHER REFERENCES

Roberts: "Field Strength and Temperature Studies of Electroluminescent Powders in Dielectric Media," Journal of The Optical Society of America, vol. 42, No. 11, November 1952, pages 850–854.